(12) United States Patent
Lee, IV et al.

(10) Patent No.: US 7,222,589 B2
(45) Date of Patent: May 29, 2007

(54) BARK CONTROL DEVICE AND ASSOCIATED VIBRATION DAMPENING HOUSING AND METHOD FOR CONSTRUCTING SUCH HOUSING

(75) Inventors: Albert L. Lee, IV, Seymour, TN (US); William S. Groh, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 10 days.

(21) Appl. No.: 10/831,519

(22) Filed: Apr. 23, 2004

(65) Prior Publication Data

US 2005/0235924 A1   Oct. 27, 2005

(51) Int. Cl.
  *A01K 15/00*   (2006.01)
  *A01L 27/00*   (2006.01)
(52) U.S. Cl. .................................................... 119/718
(58) Field of Classification Search ................. 119/718, 119/708, 908, 719
  See application file for complete search history.

(56) References Cited

U.S. PATENT DOCUMENTS

| | | | |
|---|---|---|---|
| 2,741,224 A * | 4/1956 | Putnam ....................... 119/718 |
| 4,180,013 A | 12/1979 | Smith | |
| 4,947,795 A * | 8/1990 | Farkas ......................... 119/718 |
| 5,494,002 A * | 2/1996 | Greene ........................ 119/719 |
| 5,601,054 A | 2/1997 | So | |
| 5,927,233 A | 7/1999 | Mainini et al. | |
| 6,588,376 B1 | 7/2003 | Groh | |
| 6,668,760 B2 | 12/2003 | Groh et al. | |
| 6,830,013 B2 * | 12/2004 | Williams ..................... 119/765 |
| 6,830,014 B1 * | 12/2004 | Lalor ........................... 119/859 |
| 6,907,844 B1 * | 6/2005 | Crist et al. ................... 119/718 |

* cited by examiner

*Primary Examiner*—Teri Pham Luu
*Assistant Examiner*—Susan C. Alimenti
(74) *Attorney, Agent, or Firm*—Pitts & Brittian PC

(57) ABSTRACT

A bark control device (10) for deterring a dog from barking. The bark control device (10) includes a housing (12) carried by the dog, the housing having a vibration dampening surface (13) covering at least a portion of the exterior of the housing (12). The device (10) also includes a bark detection mechanism (18), a stimulus delivery system (26) for delivering a stimulus to the dog to dissuade the dog from barking, and circuitry (22, 24) for activating the stimulus delivery system (26) in response to the detection by the bark detection mechanism (18) of a bark by the dog. The vibration dampening surface (13) of the housing (12) inhibits the delivery of false correction stimuli to the dog as the result of vibrations emanating from a source other than a bark by the dog.

38 Claims, 5 Drawing Sheets

BARK CONTROL DEVICE AND ASSOCIATED VIBRATION DAMPENING HOUSING AND METHOD FOR CONSTRUCTING SUCH HOUSING

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention relates to devices and systems that control the barking of pet dogs. More specifically, the present invention is related to a bark control device having an associated vibration dampening housing which decreases the possibility of false corrections being given to the dog. The invention also relates to a method for manufacturing a vibration dampening housing for a bark control device.

2. Description of the Related Art

Electronic bark control devices and systems that control the barking of pet dogs by delivering a correction stimulus to the dog are known in the art. Such devices use various correction stimuli such as, for example, an audible warning sound, and, more commonly, an electric shock. Further, such devices use various triggering mechanisms to determine when a bark has occurred and when a correction stimulus is to be delivered to a dog. Certain systems utilize a vibration sensor carried by the dog that detects vibrations generated by a bark and triggers the delivery of a correction stimulus. For example, the vibration sensor can be a piezoelectric device in contact with the throat of the dog as in the case of the system described in U.S. Pat. No. 5,601,054. However, bark control systems which utilize vibration sensors in contact with the throat of the dog to detect the barking of the dog can be prone to delivering false corrections to the dog. For example, the vibration sensor and associated electronic circuitry of the bark control device are typically disposed within a housing secured to the dog's neck with a collar. During the normal activities of the dog it is not uncommon for the housing to rub or scrape against objects such as furniture, bushes, food or water bowls, etc., causing vibrations. Such vibrations can be interpreted by the bark control device as a bark, resulting in a false correction being delivered to the dog. In this regard, false corrections can confuse the dog and undermine the training process. In order to limit the number of false corrections delivered to the dog, some bark control devices utilize a microphone which detects sound waves in addition to a vibration sensor which detects vibrations directly from the throat of the dog. Such devices can better discriminate between an actual bark by the dog wearing the device and other outside influences which could be mistakenly interpreted as a bark. However, devices utilizing microphones tend to be expensive, and tend to be less energy efficient such that the life of the batteries powering the devices can be significantly shortened. Therefore, bark control devices utilizing direct vibration monitors alone remain a popular alternative, notwithstanding the possibility of false corrections. Examples of various bark control devices are disclosed in U.S. Pat. Nos. 4,180,013; 5,927,233; 6,588,376; and 6,668,760.

BRIEF SUMMARY OF THE INVENTION

The present invention provides a bark control device to be carried by a dog for deterring the dog from barking and provides an associated vibration dampening housing, which reduces the possibility of false corrections being delivered to the dog. The bark control device includes a bark detection mechanism for detecting a bark emanating from the dog, this mechanism being a vibration monitor in one embodiment. The bark control device also includes a stimulus delivery system and circuitry for activating the stimulus delivery system in response to the detection by the bark detection mechanism of a bark by the dog. In one embodiment the circuitry for activating the stimulus delivery system includes a signal conditioning circuit disposed within the vibration dampening housing for conditioning the signal received from the bark detection mechanism. The circuitry also includes a processing device disposed within the housing for monitoring the conditioned signal from the signal conditioning circuit and activating the stimulus delivery system upon determination that the dog has barked.

The vibration dampening housing of the bark control device has a vibration dampening outer surface which makes the device less prone to misinterpreting vibrations from sources other than the vocal cords of the dog as a bark. Whereas the entire housing can be fabricated of an elastomer material so as to provide the vibration dampening outer surface, in one embodiment an outer vibration dampening shell or coating of elastomer material is provided over an inner casing. The elastomer material can be a natural or synthetic rubber material, or other resilient material. Accordingly, when the housing comes into contact with, or rubs against, another object, the resilient elastomer surface dampens any vibrations which may result from such contact. Further, the vibrations which are produced from such contact are characterized by an irregular stuttering pattern due to the drag produced by the elastomer surface. This stuttering pattern is dissimilar to the regular vibration pattern produced by a bark. Accordingly, the vibration dampening coating makes it less likely that vibrations will be produced which will be misinterpreted by the device as a bark from the dog.

The invention also provides a method for manufacturing a vibration dampening housing for a bark control device. The method includes the steps of molding an inner casing for enclosing at least a portion of the electronic components of the bark control device, and coating the inner casing with an elastomer material so as to produce a resilient outer surface.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
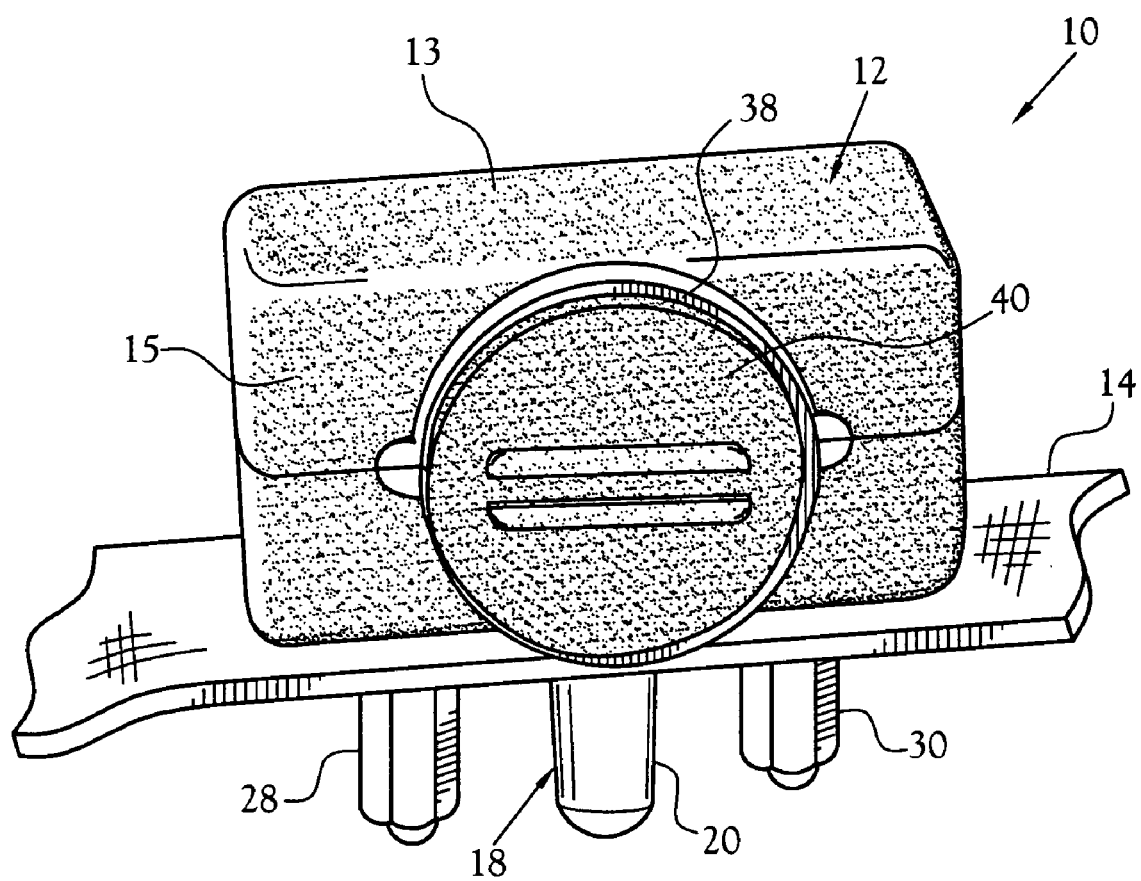
FIG. 1 is perspective view of a bark control device of the present invention mounted on a dog collar.

A bark control device of the present invention is illustrated generally at 10 in the drawings, and the associated vibration dampening housing is illustrated generally at 12. The bark control device 10 is designed to deliver a correction stimulus to a dog in response to the dog barking in order to train the dog not to bark. As will be discussed in detail below, the housing 12 of the device 10 has an outer vibration dampening surface 13, which in one embodiment is defined by an elastomer shell or coating 15. The vibration dampening surface 13 makes the device 10 less prone to delivering false correction stimuli to the dog and, therefore, provides for more effective training of the dog. Further, it will be understood by those skilled in the art that the vibration dampening housing 12 can be used with various types of bark control systems. Thus, whereas the housing 12 is described below as being used in connection with a system employing a piezoelectric vibration sensor to detect barking and a stimulus delivery system which delivers a mild shock to a dog, it will be understood that there is no intent to limit the scope of the invention to devices employing this specifically described system.

Figure 2:
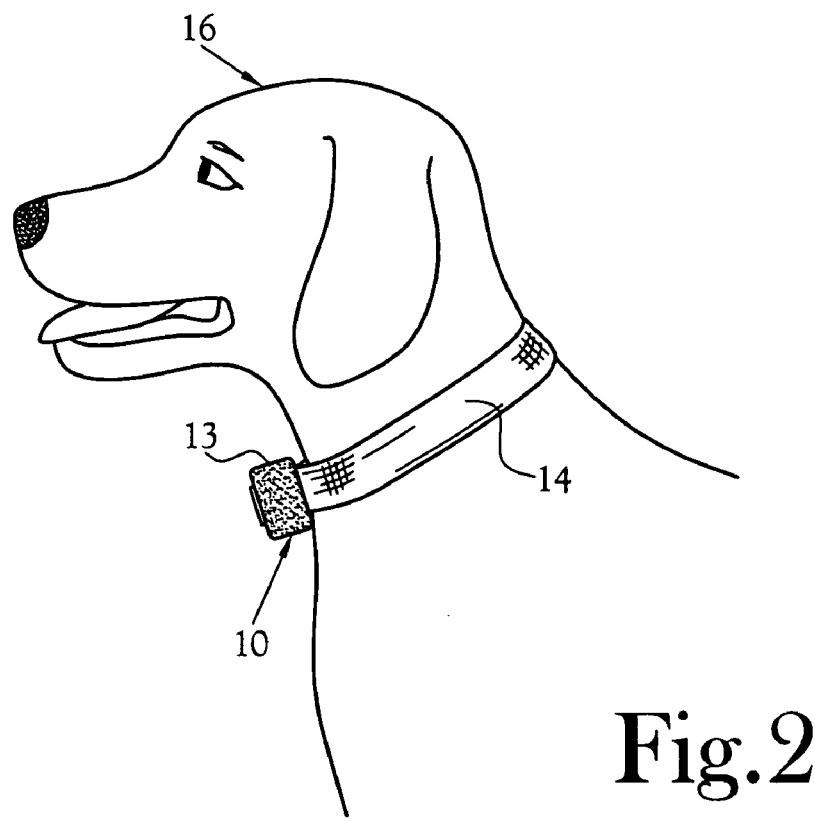
FIG. 2 is a side elevation view of a bark control device of the present invention as worn by a dog.
Figure 4:
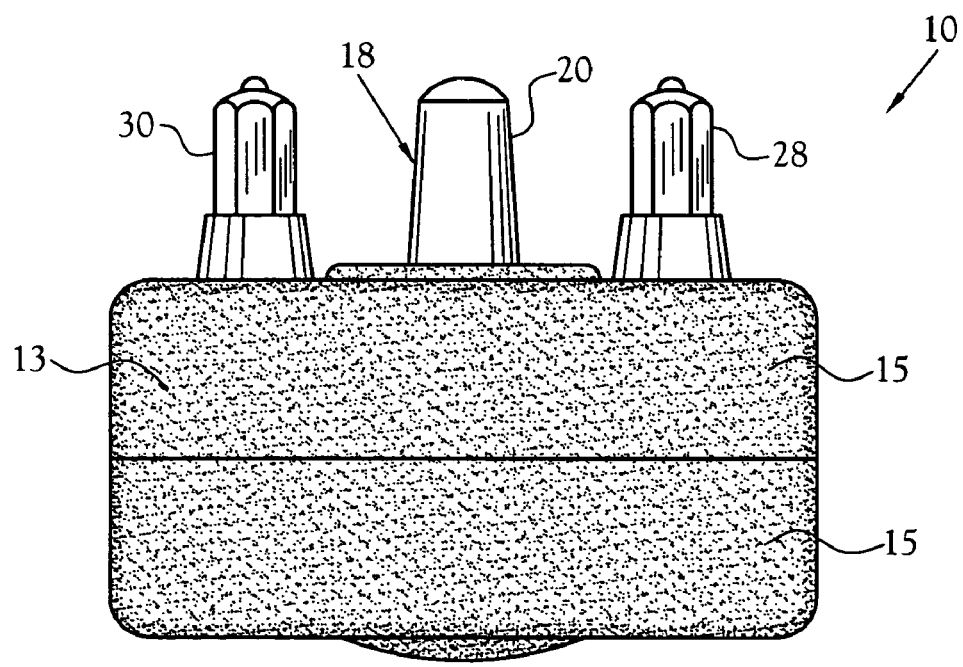
FIG. 4 is a top plan view of a bark control device of the present invention.

As illustrated in FIGS. 1 and 2, in one embodiment the bark control device 10 is designed to be mounted on a dog collar 14 which is received about the neck of a dog 16. The device 10 includes a bark detection mechanism, which in the illustrated embodiment is a vibration sensor. More specifically, in the illustrated embodiment the vibration sensor is a piezoelectric vibration sensor 18 that includes a probe 20 which is placed in contact with the throat of the dog 16 so as to directly detect vibrations generated by the vocal cords of the dog when the dog barks. The piezoelectric vibration sensor 18 is a low current device compared to other devices used for detecting the barking of a dog and, therefore, allows the device 10 to have a longer battery life. It will, however, be recognized by those skilled in the art that the bark detection mechanism can be a microphone, or a combination of a microphone and other vibration sensing mechanisms, such as, for example, the bark detection mechanism disclosed in U.S. Pat. No. 5,927,233.

Figure 3:
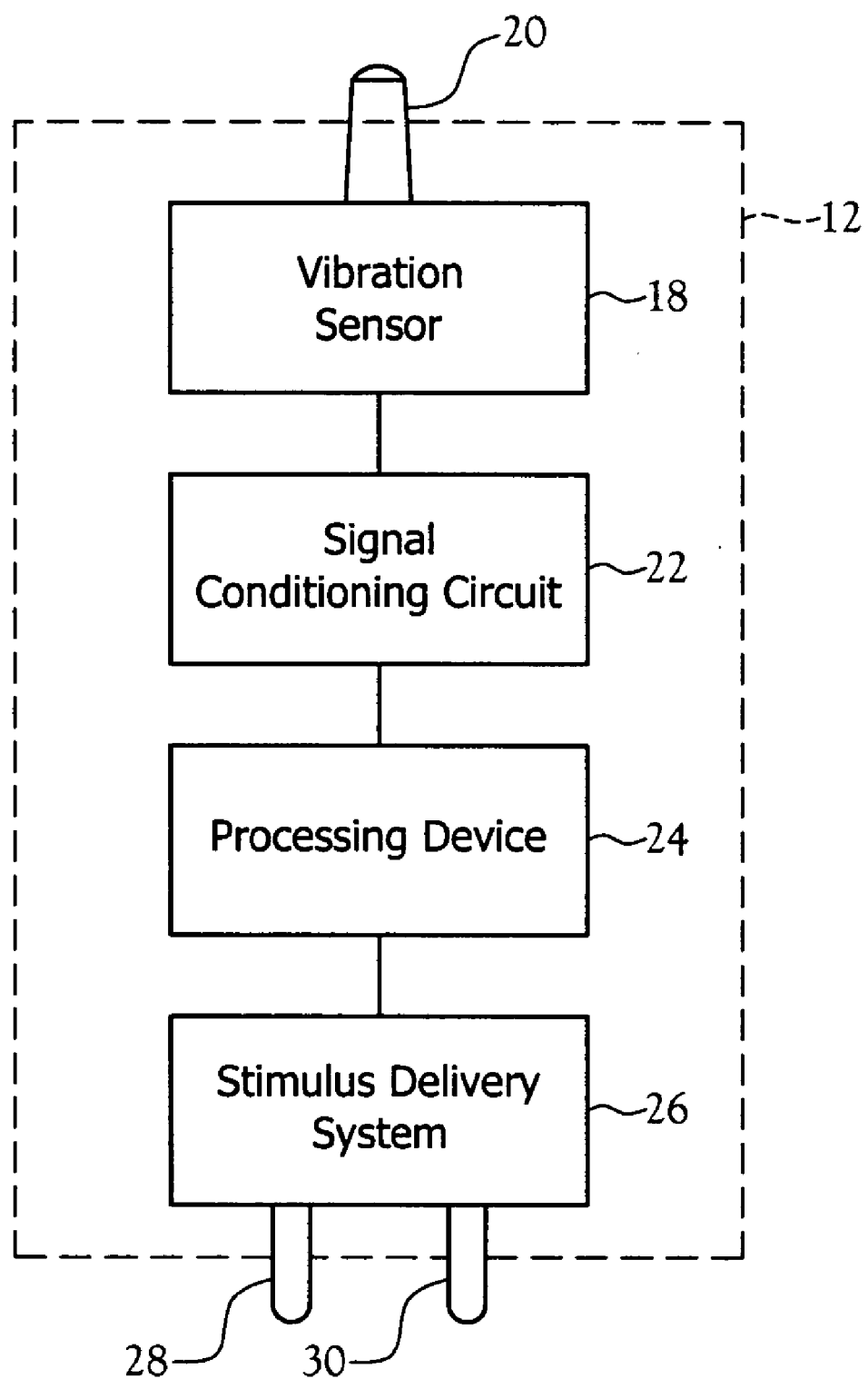
FIG. 3 is a block diagram of a bark control device of the present invention.

As illustrated in FIG. 3, a signal conditioning circuit 22 is disposed within the housing 12 and conditions the vibration signal received from the vibration sensor 18. The specific conditioning employed will depend upon the application and the desired level of sophistication of the bark detection circuit. However, typically, the signal conditioning circuit amplifies the output of the vibration sensor 18 to increase the level of the sensor output for further processing and accurate sampling. The signal conditioning circuit 22 may also serve to discriminate among the vibrations measured by the vibration sensor 18 so as to pass only measured vibrations that meet specified criteria. For example, the signal conditioning circuit 22 may be configured to pass only those vibrations occurring within a specified frequency range or those meeting certain durational limits or may be configured to remove unwanted components of the sensor output. Those skilled in the art will recognize the various filters, amplifiers, and other signal conditioning devices that can be used to prepare the measured vibrations for further processing. Those skilled in the art will also recognize that the type of signal conditioning depends upon the input signal, the corresponding sensor, and the desired characteristics of the input signal that are to be monitored. For example, the filter may be active or passive and may be set to pass a specific frequency range or remove high or low frequency noise. Further, depending upon the various components used, the output signal may not require additional amplification. Finally, other conditioning may be required to present a useable sensor output to the remainder of the circuit.

A controller or processing device 24 is also disposed within the housing 12 and monitors the amplified output of the signal conditioning circuit 22 and activates a stimulus delivery mechanism 26 as necessary. Decision-making logic within the processor 24 determines whether a stimulus is needed. Typically, the input to the processor 24 is compared against a reference value to determine whether a stimulus is warranted. A conventional processing device includes an internal timer, memory registers, and math capabilities allowing sophisticated signal processing to occur; however, those skilled in the art will recognize that these capabilities can be achieved using other components without departing from the spirit and scope of the present invention. Further, those skilled in the art will recognize that the components used depend on various factors including the cost of manufacture, size and weight constraints, and the complexity of the decision process. For example, the size and weight of the training collar worn by the animal are reduced by implementing the controller in a single application specific integrated circuit (ASIC) or a microprocessor, both of which allow complex decision making capabilities. For lower cost, larger units implementing a simple decision tree, an array of discrete logic components can be used.

Various stimulus delivery mechanisms can be used to produce deterrent effects including electrical shock, audible alerts, and other deterrent types known to those skilled in the art. By way of example, the device 10 illustrated in the Figures utilizes the stimulus delivery mechanism 26 which delivers an electric shock as a correction stimulus. In this regard, the stimulus delivery mechanism 26 incorporates a pair of electrodes 28 and 30 for transferring the electrostatic shock corrective stimulus to the dog when the delivery mechanism 26 is activated by the processing device 24.

As set forth above, the housing 12 of the device 10 has an outer vibration dampening surface 13 which makes the device 10 less prone to delivering false correction stimuli to the dog and, therefore, provides for more effective training of the dog. Whereas the entire housing 12 can be fabricated of an elastomer material so as to provide the vibration dampening outer surface 13, in one embodiment the surface 13 is defined by a shell or coating 15 made from an elastomer material, such as natural or synthetic rubber material. In this regard, a thermoplastic elastomer, such as, for example, any of the thermoplastic elastomer or thermoplastic vulcanizate products manufactured by Santoprene® can be used. However, various thermoplastic elastomer, thermoplastic vulcanizate, resilient rubber, or rubber-like materials could be used.

It will be understood that when the housing 12 comes into contact with, or rubs against, another object the resilient elastomeric surface 13 dampens any vibrations which may result from such contact. Further, with respect to the vibrations which do result from the housing 12 contacting other objects, the vibrations produced are characterized by an irregular, stuttering pattern due to the drag produced by the elastomeric surface 13. This stuttering pattern is dissimilar to the regular vibration pattern produced by a bark. Accordingly, the surface 13 makes it less likely that vibrations will be produced which will be misinterpreted by the device 10 as a bark from the dog. Moreover, an object scraping against the surface 13 produces vibrations which are at a lower frequency than vibrations produced by the barking of the dog or an object scraping against the conventional hard surface of a prior art housing. Accordingly, the processing device 24 can be configured to more easily discriminate between vibrations generated by the barking of the dog and vibrations directed to the housing but generated by objects scraping against the surface 13. Therefore, it is less likely that false corrections will be delivered to the dog.

Figure 5:
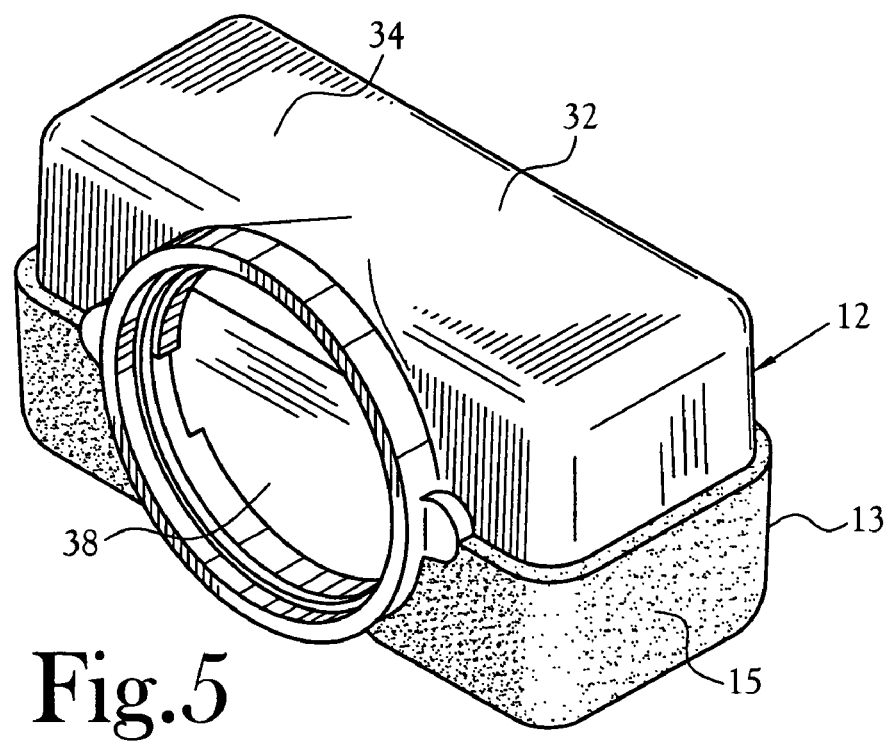
FIG. 5 is a partial perspective view of the vibration dampening housing of a bark control device of the present invention.
Figure 7:
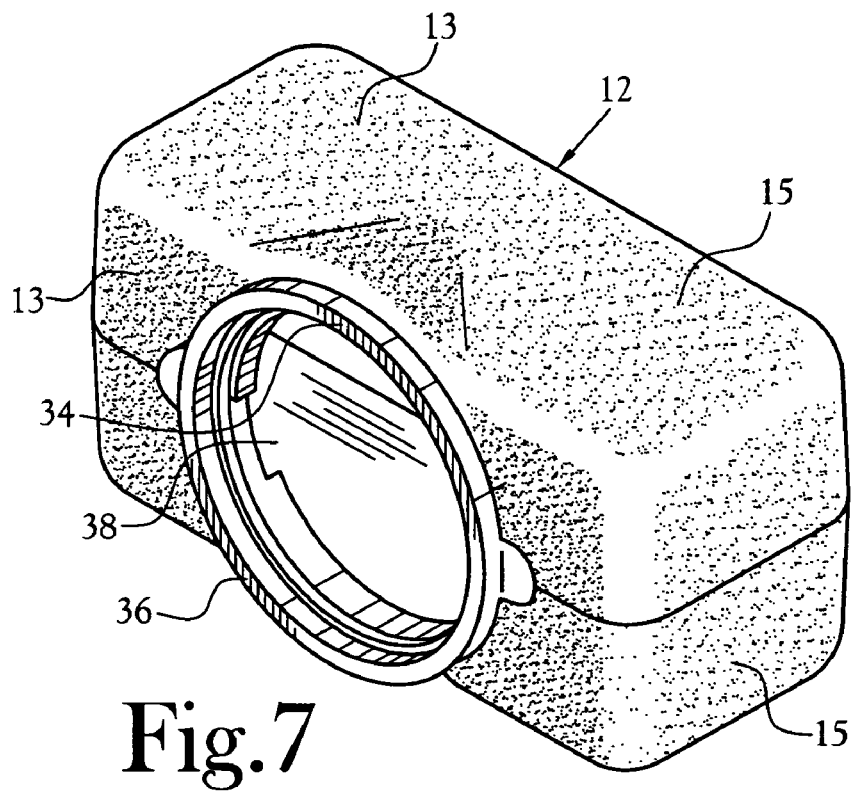
FIG. 7 is a perspective view of a vibration dampening housing of a bark control device of the present invention.
Figure 6:
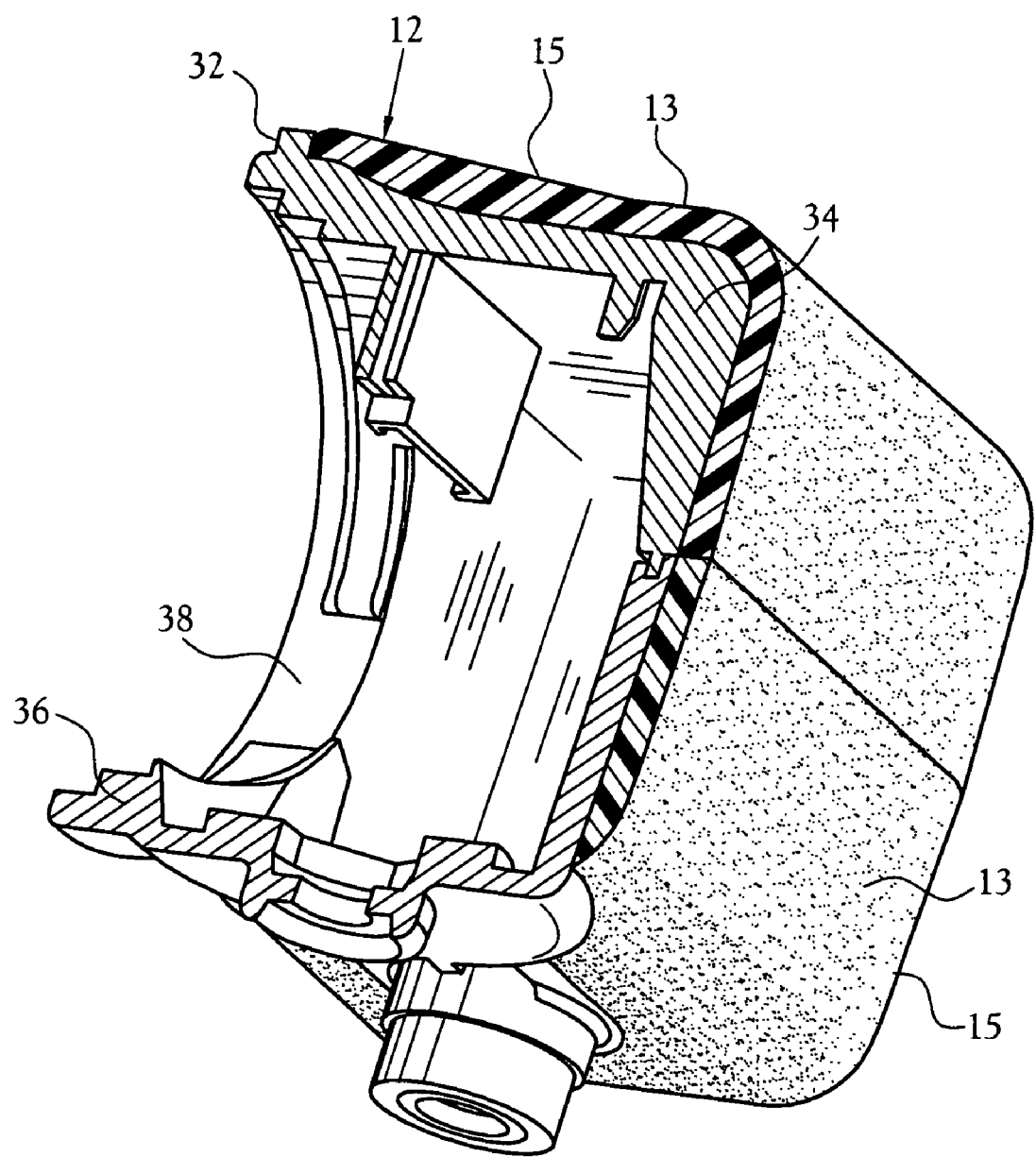
FIG. 6 is a perspective view, in section, of a vibration dampening housing of a bark control device of the present invention.

More specifically, and as best illustrated in FIGS. 5–7, in one embodiment the housing 12 includes an inner casing 32 having first and second casing components 34 and 36, respectively, which cooperatively serve to enclose various components of the bark control device 10. The coating 15 covers both of the casing components 34 and 36. It will also be noted that in this particular embodiment the casing components 34 and 36 cooperatively define an opening 38 for receiving and accessing a battery (not shown) which powers the device 10. Further, the housing 12 is provided with a releasable closure 40 for selectively covering the opening 38, and the exterior surface of the closure 40 can also be provided with the vibration dampening coating 15.

With respect to the manufacture of the housing 12, in one embodiment the inner casing 32 is mold from a strong, rigid material such as, for example, a strong, durable plastic material. In this regard, where the casing 32 includes the separate casing components 34 and 36, the components 34 and 36 are separately molded. The coating 15 can be applied to the casing 32 using various methods, such as painting or spraying the coating 15 on the exterior of the casing, or dipping the casing 32 in the coating material. However, in one embodiment the coating 15 is over-molded onto the exterior surface of the casing components 34 and 36. Over-molding insures a more uniform coating thickness and results in better bonding of the coating 15 to the casing 32. After the coating 13 is applied to the casing components 34 and 36, the electronic components of the device 10 can be positioned within casing components 34 and 36 and the casing components can be secured together with, for example, an adhesive or, alternatively, suitable mechanical fasteners.

Whereas the over-molding process described above insures a secure bonding of the coating 15 to the casing 32, it will be recognized that the coating 15 need not be directly bonded to, or adhere directly to, the casing 32. In this regard, it is contemplated that the coating 15 can be a sleeve or cover that is closely received about the casing 32 without being bonded thereto. It will also be noted that the desired thickness of the coating 15 will depend upon the particular material used to fabricate the coating, and other factors such as the cost the particular material used.

In light of the above, it will be recognized that the device 10, with its vibration dampening housing 12 provides great advantages over the prior art. The vibration dampening surface 13 greatly reduces the possibility of false corrections being delivered to the dog, while allowing the use of a low cost, energy efficient piezoelectric vibration sensor as the bark detection mechanism. Further, the surface 13 reduces the need for complex and expensive circuitry for discriminating between vibration patterns produced by a bark and those produced by other sources, thereby reducing the overall cost of the bark control device.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

We claim:

1. A bark control device for deterring a dog from barking, said device comprising:
    a housing carried by the dog, said housing having a vibration dampening cover, said vibration dampening cover substantially conforming to the shape of the exterior of said housing, said vibration dampening cover substantially enclosing said housing;
    a bark detection mechanism;
    a stimulus delivery system for delivering a stimulus to the dog to dissuade the dog from barking; and
    circuitry for activating said stimulus delivery system in response to the detection by said bark detection mechanism of a bark by the dog,
    whereby said vibration dampening cover of said housing inhibits the delivery of false correction stimuli to the dog as the result of vibrations directed to the housing but emanating from a source other than a bark by the dog.

2. The bark control device of claim 1 wherein said vibration dampening exterior cover is defined by an elastomeric material.

3. The bark control device of claim 2 wherein said elastomer material is a natural rubber material.

4. The bark control device of claim 2 wherein said elastomer material is a synthetic rubber material.

5. The bark control device of claim 1 wherein said vibration dampening cover is defined by a thermoplastic elastomer.

6. The bark control device of claim 1 wherein said vibration dampening cover is a thermoplastic vulcanizate.

7. The bark control device of claim 1 wherein said bark detection mechanism includes a vibration sensor.

8. The bark control device of claim 7 wherein said vibration sensor is a piezoelectric vibration sensor.

9. The bark control device of claim 1 wherein said circuitry for activating said stimulus delivery system includes a signal conditioning circuit disposed within said housing for conditioning a signal received from said bark detection mechanism and a processing device disposed within said housing for monitoring the conditioned signal from said signal conditioning circuit and activating said stimulus delivery system upon determination that the dog has barked.

10. The bark control device of claim 7 wherein said circuitry for activating said stimulus delivery system includes a signal conditioning circuit disposed within said housing for conditioning a signal received from said bark detection mechanism and a processing device disposed within said housing for monitoring the conditioned signal from said signal conditioning circuit and activating said stimulus delivery system upon determination that the dog has barked.

11. The bark control device of claim 10 wherein said vibration dampening cover is defined by an elastomer material.

12. The bark control device of claim 11 wherein said elastomer material is a synthetic rubber material.

13. The bark control device of claim 10 wherein said vibration dampening cover is defined by a thermoplastic elastomer.

14. The bark control device of claim 10 wherein said vibration dampening cover is a thermoplastic vulcanizate.

15. A bark control device for deterring a dog from barking, said device comprising:
- a housing carried by the dog, said housing having a vibration dampening coating, vibration dampening coating substantially assuming the contour of the exterior of said housing, said vibration dampening coating substantially covering the exterior of said housing;
- a bark detection mechanism;
- a stimulus delivery system for delivering a stimulus to the dog to dissuade the dog from barking; and
- circuitry for activating said stimulus delivery system in response to the detection by said bark detection mechanism of a bark by the dog, whereby said vibration dampening coating of said housing inhibits the delivery of false correction stimuli to the dog as the result of vibrations directed to the housing but emanating from a source other than a bark by the dog.

16. The bark control device of claim 15 wherein said vibration dampening coating includes an elastomeric material so as to define a resilient outer cover.

17. The bark control device of claim 16 wherein said elastomeric material is a natural rubber.

18. The bark control device of claim 16 wherein said elastomeric material is a synthetic rubber.

19. The bark control device of claim 15 wherein said vibration dampening coating is made from a thermoplastic elastomer.

20. The bark control device of claim 15 wherein said housing defines an inner casing and said vibration dampening coating is a thermoplastic vulcanizate.

21. The bark control device of claim 15 wherein said bark detection mechanism includes a vibration sensor.

22. The bark control device of claim 21 wherein said vibration sensor is a piezoelectric vibration sensor.

23. The bark control device of claim 15 wherein said circuitry for activating said stimulus delivery system includes a signal conditioning circuit disposed within said housing for conditioning a signal received from said bark detection mechanism and a processing device disposed within said housing for monitoring the conditioned signal from said signal conditioning circuit and activating said stimulus delivery system upon determination that the dog has barked.

24. The bark control device of claim 21 wherein said circuitry for activating said stimulus delivery system includes a signal conditioning circuit disposed within said housing for conditioning a signal received from said bark detection mechanism and a processing device disposed within said housing for monitoring the conditioned signal from said signal conditioning circuit and activating said stimulus delivery system upon determination that the dog has barked.

25. The bark control device of claim 24 wherein said housing includes an inner casing and said vibration dampening coating is made from an elastomeric material bonded to said inner casing so as to define a resilient outer cover.

26. The bark control device of claim 25 wherein said elastomeric material is a synthetic rubber material.

27. The bark control device of claim 24 wherein said vibration dampening coating is made from a thermoplastic elastomer.

28. The bark control device of claim 24 wherein said vibration dampening coating is a thermoplastic vulcanizate.

29. The bark control device of claim 15 wherein substantially covering the exterior of said housing includes stippling said vibration dampening coating on said housing.

30. A vibration dampening housing for a bark control device carried by a dog to deter barking, the bark control device including a bark detection mechanism, a stimulus delivery system for delivering a stimulus to a dog to dissuade the dog from barking, and circuitry for activating the stimulus delivery system in response to the detection by the bark detection mechanism of a bark by the dog barking, said vibration dampening housing comprising:
- a casing; and
- a vibration dampening coating outlining the physical structure of the exterior of said casing, whereby said vibration dampening coating of said housing substantially covers the exterior of said casing and inhibits the delivery of false correction stimuli to the dog as the result of vibrations emanating from a source other than a bark by the dog.

31. The vibration dampening housing of claim 30 wherein said vibration dampening coating is made from an elastomer material so as to define a resilient outer cover.

32. The vibration dampening housing of claim 31 wherein said elastomer material is a synthetic rubber.

33. The vibration dampening housing of claim 30 wherein said vibration dampening coating is made from a thermoplastic elastomer.

34. The vibration dampening housing of claim 30 wherein said vibration dampening coating is a thermoplastic vulcanizate.

35. The vibration dampening housing of claim 32 wherein said inner casing includes first and second casing components which cooperatively enclose at least a portion of the bark detection mechanism, the stimulus delivery system, and the circuitry for activating the stimulus delivery system, and wherein the exterior covers of said first and second casing components are covered with said vibration dampening coating.

36. The bark control device of claim 30 wherein said vibration dampening coating of said housing substantially covers the exterior of said casing by way of stippling.

37. A bark control device for deterring a dog from barking, said bark control device carried by a carrier worn by the dog, said bark control device comprising:
- a housing defining an exterior cover;
- a vibration dampening coating formed over at least a portion of said housing exterior cover, said vibration dampening coating substantially covering said housing exterior surface, said vibration dampening coating dampening vibrations transmitted by said housing as a result of either a sound or physical contact with said housing;
- a bark detection sensor carried by said housing, said bark detection sensor detecting vibrations produced as the result of either by a sound or by physical contact with said bark detection sensor either directly or through said housing, said bark detection sensor producing an output in response to the vibrations;
- bark detection circuitry disposed within said housing, said bark detection circuitry in communication with said bark detection sensor, said bark detection circuitry responsive to said output and producing a control signal when said output is indicative of a bark; and a stimulus delivery system carried by said housing, said stimulus delivery system responsive to said bark detection mechanism, said stimulus delivery system applying a stimulus to the dog to dissuade the dog from barking.

38. The bark control device of claim 37 wherein substantially covering said housing exterior cover includes stippling said vibration dampening coating on said housing exterior cover.

* * * * *